(12) United States Patent
Baxter

(10) Patent No.: US 7,940,317 B2
(45) Date of Patent: May 10, 2011

(54) IMAGE SENSOR HAVING A PIXEL ARRAY WITH SERIAL READOUT

(75) Inventor: Donald Baxter, Stirling (GB)

(73) Assignee: STMicroelectronics Ltd., Marlow-Buckinghamshire (GB)

( * ) Notice: Subject to any disclaimer, the term of this patent is extended or adjusted under 35 U.S.C. 154(b) by 797 days.

(21) Appl. No.: 11/273,477

(22) Filed: Nov. 14, 2005

(65) Prior Publication Data

US 2006/0125941 A1    Jun. 15, 2006

(30) Foreign Application Priority Data

Nov. 12, 2004  (EP) .................................. 04257023

(51) Int. Cl.
*H04N 3/14* (2006.01)
(52) U.S. Cl. .................... 348/302; 348/374; 348/231.99
(58) Field of Classification Search .................. 348/302, 348/374, 231.99
See application file for complete search history.

(56) References Cited

U.S. PATENT DOCUMENTS

| | | | | |
|---|---|---|---|---|
| 5,565,915 A * | 10/1996 | Kindo et al. | .................. | 348/308 |
| 6,522,395 B1 * | 2/2003 | Bamji et al. | .................. | 356/5.01 |
| 6,541,751 B1 * | 4/2003 | Bidermann | ................ | 250/208.1 |
| 6,549,644 B1 * | 4/2003 | Yamamoto | ................... | 382/118 |
| 6,559,788 B1 | 5/2003 | Murphy | ........................ | 341/164 |
| 6,587,145 B1 | 7/2003 | Hou | ............................... | 348/297 |
| 7,002,628 B1 * | 2/2006 | Panicacci | ...................... | 348/307 |
| 7,129,883 B2 * | 10/2006 | Muramatsu et al. | .......... | 341/164 |
| 7,139,024 B2 * | 11/2006 | Lu et al. | ......................... | 348/303 |
| 7,379,106 B2 * | 5/2008 | Bean et al. | .................... | 348/294 |
| 2001/0012068 A1 * | 8/2001 | O'Connor | .................... | 348/294 |
| 2003/0111590 A1 | 6/2003 | Mattison | ................... | 250/208.2 |
| 2004/0160349 A1 * | 8/2004 | Laflaquiere | ................... | 341/147 |
| 2006/0013485 A1 * | 1/2006 | Nitta et al. | .................... | 382/194 |

FOREIGN PATENT DOCUMENTS

EP   1107581   6/2001

OTHER PUBLICATIONS

"A 10,000 Frames/s 0.18 μm CMOS Digital Pixel Sensor with Pixel-Level Memory", Kleinfelder et al., 2001 International Solid States Circuit Conference, Feb. 5, 2001, 10 pages.

* cited by examiner

*Primary Examiner* — Jason Chan
*Assistant Examiner* — Usman Khan
(74) *Attorney, Agent, or Firm* — Lisa K. Jorgenson; Allen, Dyer, Doppelt, Milbrath & Gilchrist, P.A.

(57) ABSTRACT

The image sensor includes an array of pixels, each pixel having a photo-diode, for providing a pixel voltage, an analog-to-digital converter (ADC) operable to convert the pixel voltage to a digital value and a memory for storing the digital value. Read circuitry is included for reading out the digital values from the pixels of the array in a predetermined order. The image sensor may be configured such that a counter incorporates the memory, and the counter may be adapted to operate as a shift register. The counters of two or more pixels may be connected to form one or more chains such that digital values can be read out in a bit-serial manner.

19 Claims, 4 Drawing Sheets

IMAGE SENSOR HAVING A PIXEL ARRAY WITH SERIAL READOUT

FIELD OF THE INVENTION

The present invention relates to an image sensor, and particularly, to a serial readout CMOS image sensor.

BACKGROUND OF THE INVENTION

Typically, CMOS image sensors have a pixel array with information from each pixel in a row of the pixel array being read out in parallel. This requires each pixel in a column of the pixel array to be connected to a common column bus. Each row is selected in turn and the pixel information read out on each column bus. As image sensor resolution increases, pixel array size increases accordingly, requiring that a single pixel drive an increasingly large column bus.

SUMMARY OF THE INVENTION

According to the first aspect of the present invention there is provided an image sensor including an array of pixels, each pixel comprising a photo-diode, for providing a pixel voltage, an analog-to-digital converter (ADC) operable to convert the pixel voltage to a digital value and a memory for storing the digital value. The image sensor includes a reading circuit or means for reading out the digital values from the pixels of the array in a predetermined order.

Preferably, the means for reading out comprises means for connecting the pixel memories in one or more chains. Preferably, the ADC comprises a comparator, wherein the comparator is supplied with a ramp voltage and detects when the ramp voltage is substantially equivalent to the pixel voltage, and a counter, the counter also providing the pixel memory.

Preferably, the counter is adaptable to operate as a shift register and the counter of two or more pixels in the pixel array are connected in series to form the chain enabling a bit-serial readout of the two or more pixels. Preferably, the counter comprises one or more memory elements for storing the digital values. Preferably, the chain comprises each pixel in a row enabling bit-serial readout of each row. Alternatively, the chain comprises each pixel in a column enabling bit serial readout of each column.

Further alternatively, the chain comprises each pixel in the pixel array enabling bit-serial readout of the entire pixel array. Preferably, the chain has an input tied to logic "zero" enabling the bit-serial readout of the chain to set the memory element of the counter in each pixel to logic "zero". Preferably, the memory element is a D-type memory element.

According to a second aspect of the present invention there is provided an optical pointing device comprising a serial readout image sensor according to the first aspect of the invention. Preferably, the optical pointing device is an optical mouse.

According to a third aspect of the present invention there is provided a mobile device comprising a serial readout image sensor according to the first aspect of the invention. Preferably, the mobile device is a mobile cellular telephone. Alternatively, the mobile device is a camera.

BRIEF DESCRIPTION OF THE DRAWINGS

Embodiments of the present invention will now be described with reference to the accompanying drawings, in which.

DETAILED DESCRIPTION OF THE PREFERRED EMBODIMENTS

Figure 1:
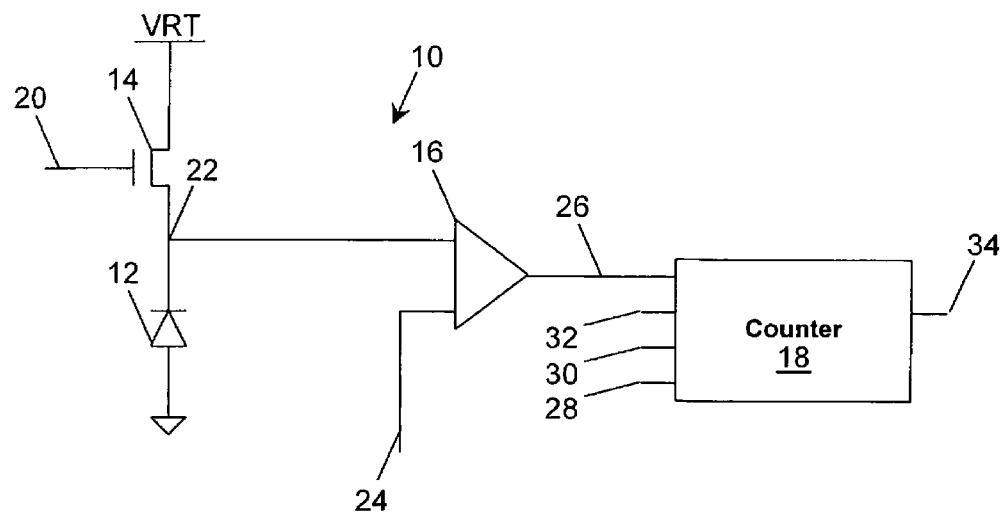
FIG. 1 is a schematic diagram illustrating a pixel according to the present invention.
Figure 2:
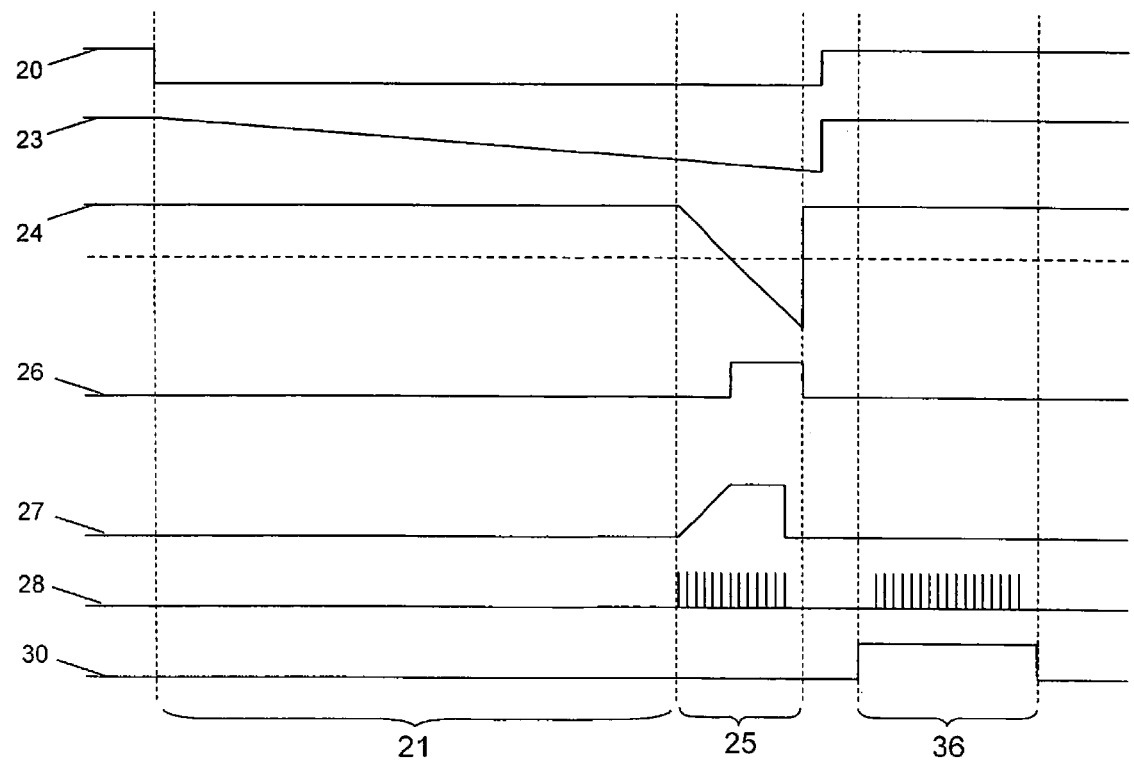
FIG. 2 is a signal timing diagram illustrating one embodiment of various signal levels used to operate a pixel according to the present invention.

Referring initially to FIG. 1, and FIG. 2, a pixel 10 comprises a photodiode 12, reset transistor 14, comparator 16 and counter 18. A reset signal 20 is applied to the gate, a supply voltage VRT is applied to the source and a node 22 is connected to the drain of the reset transistor 14. When the reset signal 20 is high, the node 22 has a pixel voltage 23 equivalent to the supply voltage VRT.

When the reset signal 20 is low, the pixel 10 enters an integration phase 21 and the node 22 has a pixel voltage 23 related to impinging light on the photodiode 12. The pixel voltage 23, when the reset signal 20 is low, varies according to the amount of impinging light and the integration time. At the end of the integration phase 21, and while the reset signal 20 is still low, the pixel 10 enters an ADC (Analog to Digital Converter) conversion phase 25.

The comparator 16 has a first input connected to the node 22 and a second input connected to a ramp generator (not shown), which provides a ramp signal 24. The comparator 16 has a comparator output 26 connected to the counter 18. The counter 18 also receives a clock signal 28, a scan enable input 30 and a scan input 32. The counter also has a scan output 34. The counter 18 may be a true counter, that is, increments its value every clock cycle, or a pseudo random linear feedback shift register (LFSR).

Once the ADC conversion phase 25 has begun, the ramp generator starts reducing the ramp signal 24 from supply voltage and the counter 18 a count sequence 27 and starts to digitally count. When the ramp signal 24 is equal to the pixel voltage, the comparator output 26 goes from low to high stopping the counter 18 at a digital value equivalent to the pixel voltage. Once the ADC conversion phase 25 has completed, a readout phase 36 can begin. The scan enable input 30 is set high which adapts the counter 18 to operate as a shift register.

Figure 3:
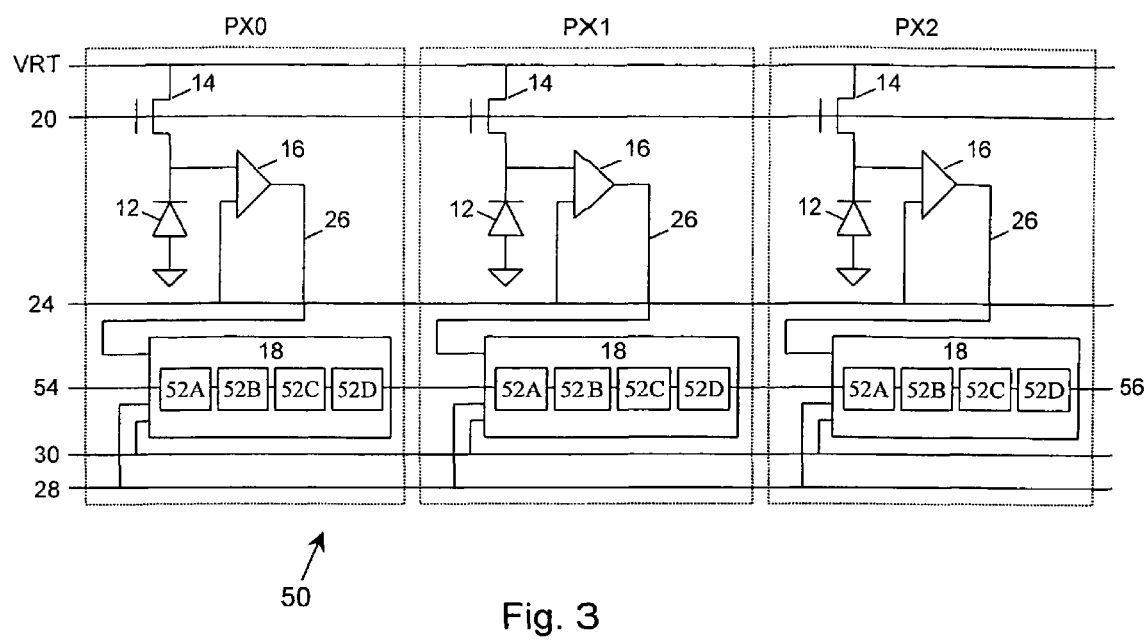
FIG. 3 is a schematic diagram illustrating a counter chain of three pixels according to the present invention.

The counter 18 is part of a counter chain, which is more fully described below. The scan input 32 is connected to a scan output from a previous pixel in the counter chain. The scan output 34 is connected to a scan input of a subsequent pixel in the counter chain. Referring to FIG. 3, a counter chain 50 has a first pixel PX1, a second pixel PX2 and a third pixel PX3 each equivalent to the pixel 10 as described previously and therefore like references are numbered accordingly.

The counters 18 are now shown with memory elements 52. In this example, four memory elements are shown which would enable a four-bit number to represent the pixel voltage. In preference, the memory elements are D-type memory elements. With scan enable 30 set at high the counters 18 are configured as shift registers. The first pixel PX0 has its scan input 32 connected to a low input 54. The third pixel PX2 has its scan output 34 connected to a serial output 56.

Once the clock 28 is active as well as the scan enable 30 being high, each bit in each memory element 52 is moved one memory element towards the serial output 56 on each clock pulse. For example, on the first clock pulse, the first pixel's PX0 memory element 52D has its value shifted to the second pixel's PX1 memory element 52A. Therefore the serial output 56 receives one bit at a time and, knowing the length of each digital pixel value can reconstruct the digital pixel value for each pixel.

As the first pixel PX0 has its scan input 32 connected to a low input 54, and, as the digital pixel values are shifted one place on each clock pulse, the memory elements 52 have their digital pixel values replaced with low values. Each pixel, once all digital pixel values are readout, has all its memory elements storing low values. The shift register operation thereby acting as an automatic reset of the memory elements 52 during each readout phase. Furthermore, there is no requirement for a global counter reset signal. The counters re-configured as a shift register may be either connected together on a row-by-row basis, column-by-column basis or as a global counter chain.

Figure 4:
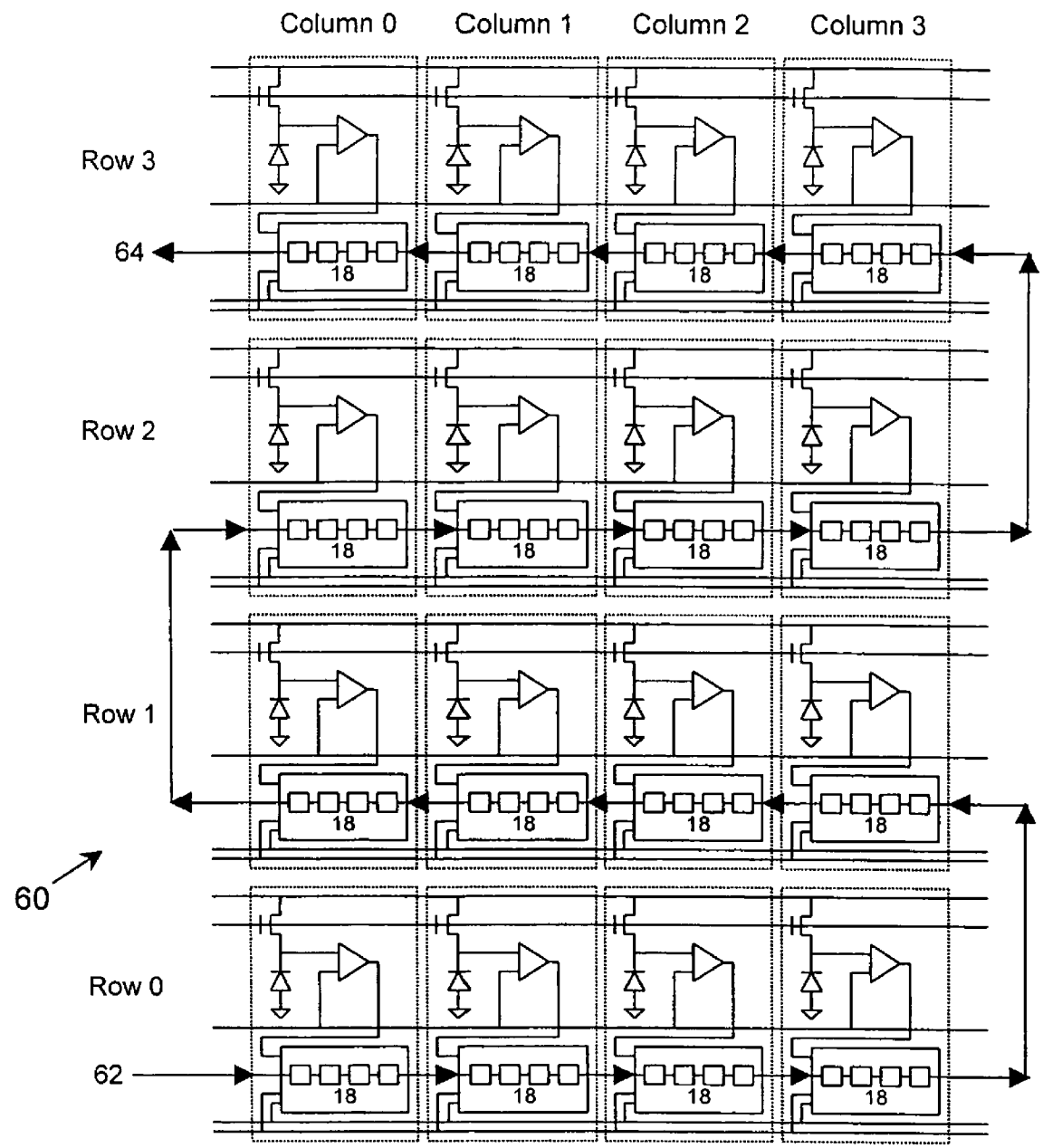
FIG. 4 is a schematic diagram illustrating a counter chain of each pixel in a pixel array according to the present invention.

FIG. 4 shows how a pixel array 60 can be connected together as a global counter chain. Firstly, pixel (0,0) has its counter scan input connected to low input 62 and the remaining pixels in row 0 are connected together as described above for FIG. 3 except for pixel (0,3). The last pixel in row 0, pixel (0,3), has its counter scan output connected to the last pixel in row 1, pixel (1,3). Row 1 pixels are then connected together moving from column 3 to column 0. The first pixel in row 1, pixel (1,0), is then connected to the first pixel in row 2, pixel (2,0). This method of connection continues through the pixel array until the end of the counter chain is reached, in this case the last pixel in the counter chain is pixel (3,0), being the first pixel in row 3. Pixel (3,0) is connected to serial output 64 which receives all the pixel value from the pixel array 60 on a bit-serial basis.

Figure 5:
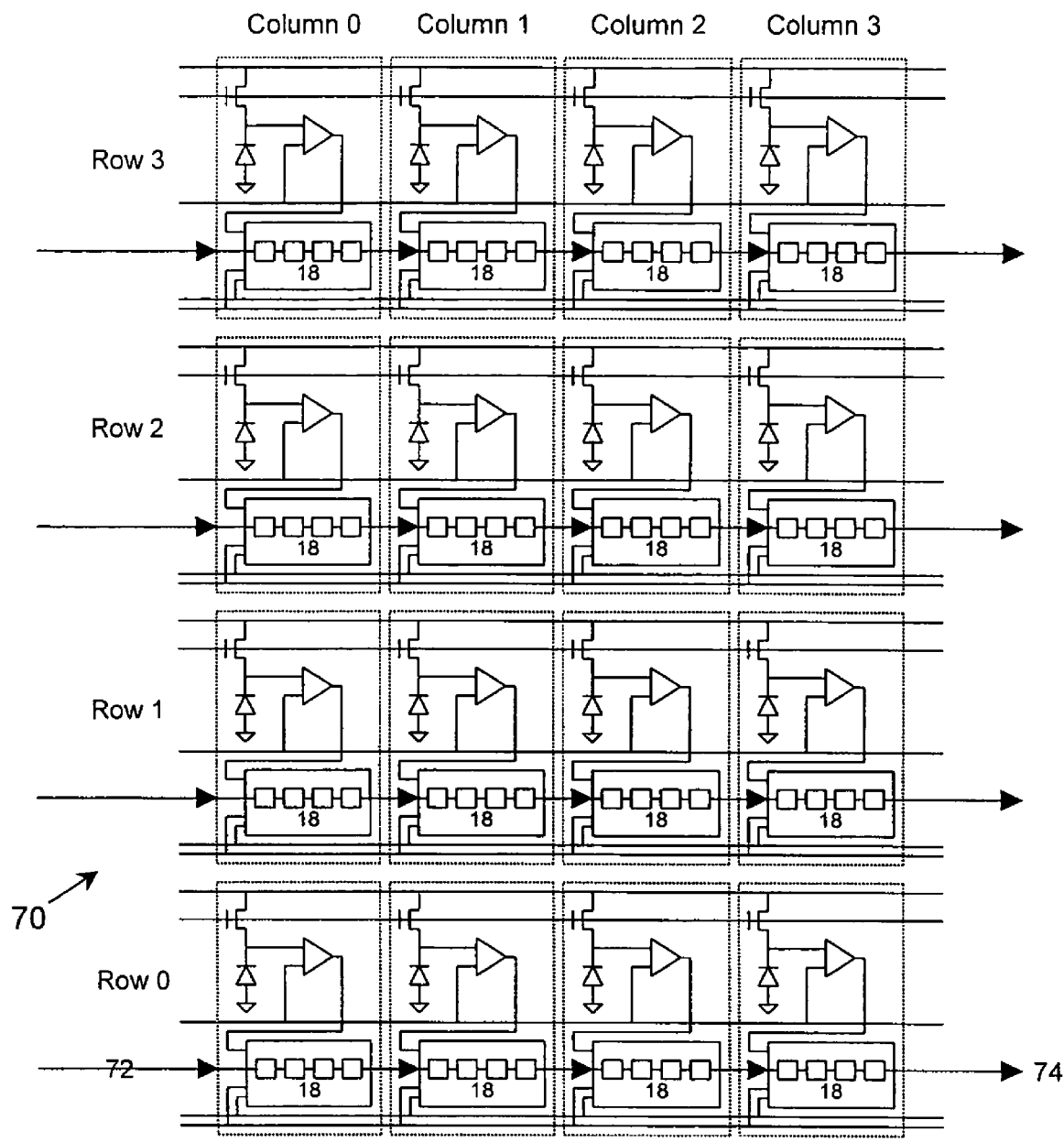
FIG. 5 is a schematic diagram illustrating several counter chains of each pixel in a row according to the present invention.

FIG. 5 shows how a pixel array 70 can be connected together on a row-by-row basis as a number of parallel counter chains. All pixels in row 0 are connected together in series with the first pixel in row 0, pixel (0,0), having a low input 72 and the last pixel in row 0, pixel (0,3), being connected to a row 0 serial output 74. Row 1, row 2 and row 3 each have individual counter chains having individual low inputs and serial outputs. This enables parallel readout of each row.

The pixel array 70 can also be read out on a column-by-column basis by modifying the connections between pixels such that the pixels are connected together in columns. It may also be possible to choose other arrangements of connections between the pixels for readout without departing from the scope of the invention.

The present invention only requires local pixel-to-pixel interconnections to enable readout of the pixel data rather than an interconnect which spans a whole column or row or a digital pixel which has a parallel readout. This approach has several benefits in including: no global wide (for example, 8-bit) data bus to distribute; as the readout mechanism is integrated within the pixel there is no need for additional readout circuitry (for example, x and y shift registers); smaller routing overhead in the pixel cell enabling more area available for the photo sensitive part of the pixel; and improved scalability as the output of one pixel only has to drive its neighbor rather than long wire length of which increases with the resolution of the sensor.

Improvements and modifications may be incorporated without departing from the scope of the present invention.

That which is claimed is:

1. An image sensor comprising:
   an array of pixels, each pixel comprising a respective photo-diode for providing a pixel voltage, a respective analog-to-digital converter (ADC) operable to convert the pixel voltage to a digital value and a respective pixel memory, defined by a counter, for storing the digital value, the ADC comprising a comparator, having an output connected to the counter, and supplied with a ramp voltage to detect when the ramp voltage is substantially equivalent to the pixel voltage; and
   a reading circuit, connecting the pixel memories in at least one chain, and for reading out the digital values from the pixels of the array in a predetermined order.

2. The image sensor as claimed in claim 1, wherein the counter is operable as a shift register and the counters of at least two pixels in the pixel array are connected in series to define the at least one chain and providing a bit-serial readout of the at least two pixels.

3. The image sensor as claimed in claim 2, wherein the counter comprises at least one memory element for storing the digital values.

4. The image sensor as claimed in claim 3, wherein the at least one chain includes a row of pixels to provide bit-serial readout of each row.

5. The image sensor as claimed in claim 3, wherein the at least one chain includes a column of pixels to provide bit-serial readout of each column.

6. The image sensor as claimed in claim 3, wherein the at least one chain includes the array of pixels to provide bit-serial readout of the entire pixel array.

7. The image sensor as claimed in claim 3, wherein the at least one chain includes an input to receive a reset value so the bit-serial readout of the chain resets the memory element of the counter in each pixel.

8. The image sensor as claimed in claim 3, wherein the memory element is a D-type memory element.

9. An electronic device comprising:
   an image sensor including
      an array of pixels, each pixel comprising a respective photo-diode for providing a pixel voltage, a respective analog-to-digital converter (ADC) operable to convert the pixel voltage to a digital value and a respective pixel memory, defined by a counter, for storing the digital value, the ADC comprising a comparator, having an output connected to the counter, and supplied with a ramp voltage to detect when the ramp voltage is substantially equivalent to the pixel voltage, and
      a reading circuit, connecting the pixel memories in at least one chain, and for reading out the digital values from the pixels of the array in a predetermined order.

10. The electronic device as claimed in claim 9, wherein the counter is operable as a shift register and the counters of at least two pixels in the pixel array are connected in series to define the at least one chain and providing a bit-serial readout of the at least two pixels.

11. The electronic device as claimed in claim 10, wherein the counter comprises at least one memory element for storing the digital values.

12. The electronic device as claimed in claim 11, wherein the electronic device is an optical pointing device.

13. The electronic device as claimed in claim 12, wherein the optical pointing device is an optical mouse.

14. The electronic device as claimed in claim 11, wherein the electronic device is a mobile electronic device.

15. The electronic device as claimed in claim 14, wherein the mobile electronic device is a mobile telephone.

16. The electronic device as claimed in claim 14, wherein the mobile electronic device is a camera.

17. A method of making an image sensor comprising:

forming an array of pixels, each pixel respectively comprising a respective photo-diode for providing a pixel voltage, a respective analog-to-digital converter (ADC) operable to convert the pixel voltage to a digital value and a respective pixel memory, defined by a counter, for storing the digital value, the ADC comprising a comparator, having an output connected to the counter, and supplied with a ramp voltage to detect when the ramp voltage is substantially equivalent to the pixel voltage; and providing a reading circuit to connect the pixel memories in at least one chain, and for reading out the digital values from the pixels of the array in a predetermined order.

18. The method as claimed in claim 17, wherein the counter is operable as a shift register and the counters of at least two pixels in the pixel array are connected in series to define the at least one chain and providing a bit-serial readout of the at least two pixels.

19. The method as claimed in claim 18, wherein the counter comprises at least one memory element for storing the digital values.

\* \* \* \* \*